United States Patent [19]
Hirata et al.

[11] 3,784,291
[45] Jan. 8, 1974

[54] ELECTROMAGNETIC SHUTTER RELEASING DEVICE FOR A PHOTOGRAPHIC CAMERA

[75] Inventors: Noritsugu Hirata, Yokohama; Tomoshi Takigawa, Tokyo, both of Japan

[73] Assignee: Canon Kabushiki Kaisha, Tokyo, Japan

[22] Filed: Oct. 22, 1971

[21] Appl. No.: 191,609

[30] Foreign Application Priority Data
Oct. 23, 1970 Japan.............................. 45/93807

[52] U.S. Cl.............. 352/169, 95/53 E, 95/53 EA, 352/174
[51] Int. Cl. .......................................... G03b 17/46
[58] Field of Search....................... 95/53 E, 53 EA; 352/169, 174

[56] References Cited
UNITED STATES PATENTS
3,635,141   1/1972   Starp ............................. 95/53 EA
3,598,480   8/1971   Kubota .............................. 352/169
3,576,362   4/1971   Mayr.................................. 352/169
3,636,850   1/1972   Kikuchi et al..................... 95/53 EA

*Primary Examiner*—Samuel S. Matthews
*Assistant Examiner*—Russell E. Adams, Jr.
*Attorney*—Joseph M. Firzpa

[57] ABSTRACT

An electromagnetic shutter releasing device for a photographic camera utilizes, in combination with a permanent magnet, an electromagnet controlled by a pulse-like electric input to electromagnetically release a movable shutter blade from its normal stop position to a position for exposing a film. The polarity of the electric input to the electromagnet may be reversed so as to cause an interaction between the electromagnet and the permanent magnet and the resulting relative movement of the two magnets is detected to start and stop a shutter shaft drive motor. During a continuous shot, the drive motor may be maintained operative with the aid of the permanent magnet alone and without any electric input applied to the electromagnet.

14 Claims, 21 Drawing Figures

ELECTROMAGNETIC SHUTTER RELEASING DEVICE FOR A PHOTOGRAPHIC CAMERA

BACKGROUND OF THE INVENTION

1. Field of the Invention

This invention relates to an electromagnetic shutter releasing device for a photographic camera, and more particularly to such a device provided with electromagnet means and permanent magnet means to operate means for driving a shutter blade which controls an exposure.

2. Description of the Prior Art

In a still or motion picture camera, it is the usual practice to accomplish a continuous shot by continuously depressing a shutter release button and to accomplish a single-frame shot by temporally depressing the shutter button through the use of a simple change-over mechanism. In either case, any incorrect start or stop position of the shutter drive motor would cause the shutter to stop at a position for leaving the film aperture uncovered or cause electric current to flow continuedly even after the motor has stopped. To obviate such inconveniences, the following actions must take place in a proper sequence:

1. A shutter release switch is closed.
2. A stopper engaged with the drive motor shaft is disengaged therefrom.
3. The motor starts rotating upon closing of the motor circuit.
4. The stopper is maintained in its disengaged position and the motor continues to rotate with the motor circuit maintained in its closed condition.
5. The motor circuit continues its closed condition and the stopper returns to its initial position.
6. The shutter drive shaft stops at its normal stop position upon engagement of the stopper with a recessed or projected portion formed in a shaft driven by the motor.

To enable this, numerous electromagnetic shutter releasing devices have heretofore been proposed, but any of these devices when applied to still or motion picture cameras has encountered a great barrier in that during the time when the action under item (4) above occurs, i.e. during a cycle of continuous shot when the stopper is maintained out of engagement with the drive motor shaft, an electric current must continue flowing in the electromagnet to maintain the stopper in such disengaged position, although this means a substantially high consumption of electric power in a motion picture camera whose power source is very much limited in capacity. For example, German Patent No. 1,918,733 discloses an electromagnetic shutter releasing device of the type which utilizes an electromagnet to control a reversible motor and in which a current continues to flow through the electromagnet during a continuous shot. Also, German Patent No. 1,948,674 discloses, as an electromagnetic shutter releasing device of similar type, a mechanism which employs two electromagnets so that a current of relatively great magnitude flows in the coil on one of the two electromagnets to disengage the stopper from the shutter blade drive motor shaft while a current of small magnitude flows in the coil on the other electromagnet during a continuous shot to maintain the stopper in its disengaged position. However, even a small current may result in an increased power comsumption as the number of the continuous shots increases, and this mechanism has again encountered inconveniences when the still or motion picture camera provided with such mechanism is used in outdoor environments where the camera must resort to a power source of limited capacity such as storage battery or the like.

SUMMARY OF THE INVENTION

It is an object of the present invention to provide, in a still or motion picture camera, an electromagnetic shutter releasing device which includes electromagnet means formed of a soft magnetic material having a coil wound thereon and permanent magnet means interacting with the magnetic circuit of the electromagnet means and in which a stopper for controlling the position of a rotatable shutter shaft is maintained in released position by the action of the permanent magnet means during a continuous shot without any electric input applied to the electromagnet means.

It is another object of the present invention to provide, in a still or motion picture camera, an electromagnetic shutter releasing device in which electric pulses of opposite polarities such as electric currents are alternately applied to the electromagnet means and the relative movement of the electromagnet means and the permanent magnet means caused by mutual attraction or repulsion therebetween is detected to actuate switching means for controlling the opening and closing of a shutter shaft drive motor circuit so as to enable single-frame shots and continuous shots.

It is still another object of the present invention to provide, in a still or motion picture camera, an electromagnetic shutter releasing device which further includes operating means movable from a first position to a second position or vice versa to change over the motor circuit switching means so that the switching means is closed for one of said positions and opened for the other positions by the interaction between the electromagnet and permanent magnet means, thereby enabling single-frame shots and continuous shots.

It is yet another object of the present invention to provide, in a still or motion picture camera, an electromagnetic shutter releasing device which further includes switch means adapted to close when the shutter blade is not covering the aperture and to open when the shutter blade is in its normal stop position, and in which the switch means, when opened, has one end thereof connected so as to short-circuit the shutter drive motor circuit to control the stop position of the shutter blade.

It is still another object of the present invention to provide, in a still or motion picture camera, an electromagnetic shutter releasing device which further includes means for changing over the direction of rotation of the shutter shaft drive motor so as to release the stopper member from its engagement with a shaft driven by the motor irrespective of the direction of rotation of the motor.

It is another object of the present invention to provide, in a still or motion picture camera, an electromagnetic shutter releasing device which further includes a capacitor serially connected with a power source and the electromagnet means and charged or discharged in response to the change-over of the switch means for opening and closing the shutter drive motor.

Other objects and features of the present invention will become fully apparent from the following description of embodiments taken in conjunction with the accompanying drawings.

BRIEF DESCRIPTION OF THE DRAWINGS

FIGS. 2 to 4 show an embodiment of the electromagnetic shutter releasing device according to the present invention.

FIGS. 6 and 7 show another embodiment of the device according to the present invention.

FIG. 6b is a sectional view taken along line B—B of FIG. 6a.

FIG. 7b is a sectional view taken along line B—B of FIG. 7a.

FIG. 8b is a sectional view taken along line B—B of FIG. 8a.

DESCRIPTION OF THE PREFERRED EMBODIMENTS

Figure 12:
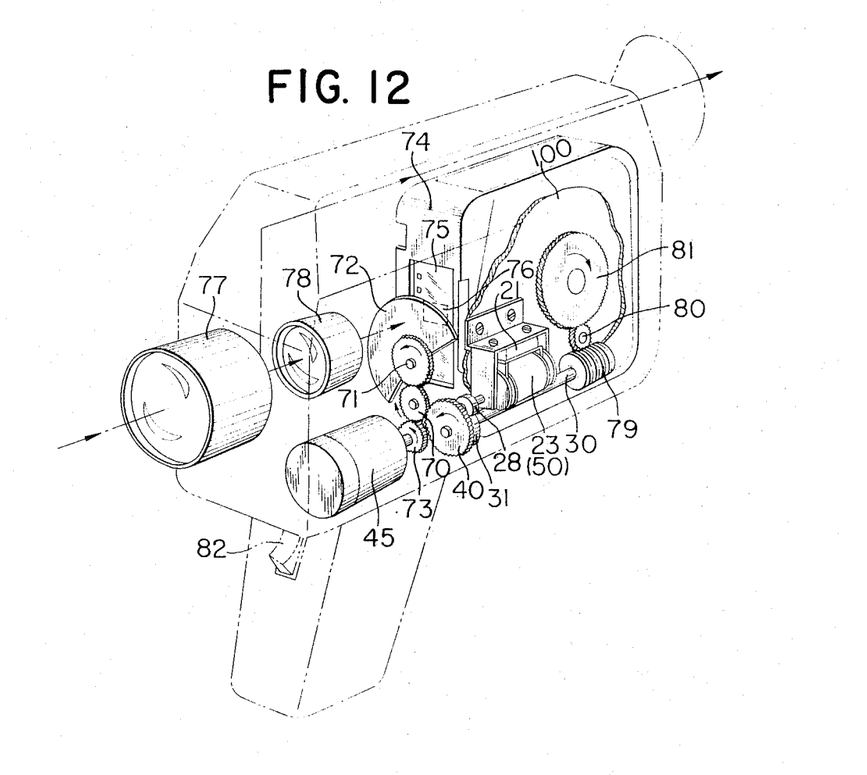
FIG. 12 is a partly broken-away perspective view showing an entire motion picture camera which incorporates the electromagnetic shutter releasing device, especially of the type as shown in FIGS. 6–8.

As shown in FIG. 12 of the drawings and described in detail hereunder, it is to be understood that the present invention is described with respect to a motion picture camera of the conventional type having a shutter blade adapted, when rotated by a camera drive motor, to intermittently uncover an aperture through which light may pass for exposing the film thereto.

Figure 1:
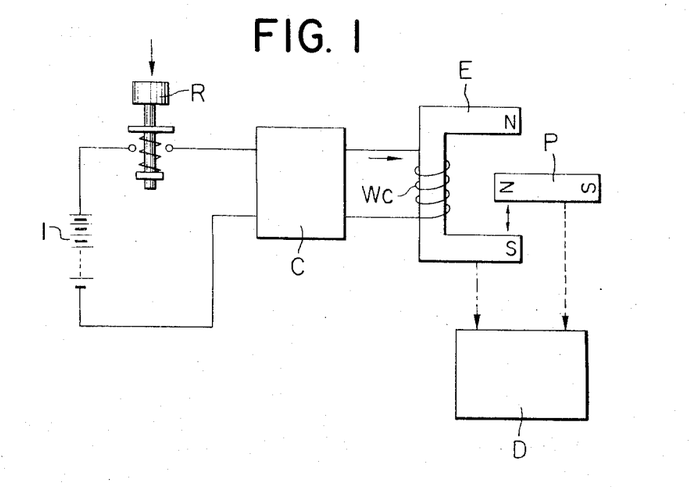
FIG. 1 is a schematic diagram for illustrating the principle of the present invention.

With this understanding, reference is first had to FIG. 1 to describe the basic construction and operation which is common to the various embodiments of the present invention to be described hereinafter. A release button R may be depressed as indicated by arrow, to close the shown electric circuit. The circuit includes a power source 1, an electromagnet E of soft magnetic material having a coil Wc wound thereon, and a control circuit C for controlling the current flowing to the coil Wc. The control circuit C includes switching means which may be changed over to change the direction of the current flowing to the coil Wc. A permanent magnet P is disposed so as to interact with the flux from the electromagnet E. Assume that current is being controlled to flow to the coil Wc in the direction as indicated by arrow. Then the electromagnet E will have its opposite ends magnetized as poles N and S. Thus, as shown, mutual repulsion will occur between the pole N of the permanent magnet P and the pole N of the electromagnet E and mutual attraction will occur between the pole N of the magnet P and the pole S of the electromagnet E. As the result, movable one of the two magnets E and P will be moved. Operating means D will detect such movement to thereby close or open a motor circuit for driving the shutter shaft of the motion picture camera. In FIG. 1, the chain line and the dotted line both directed to the operating means D indicate from which of the two magnets the movement is transmitted. If the current is flowed in the direction opposite to the direction of the arrow, the movable one of the magnets will be moved also in the opposite direction to allow change-over of the operating means D. Especially, when the electromagnet E is provided with ferromagnetic members which are magnetizable with the electromagnet, a durable attraction can occur between the ferromagnetic members and the electromagnet whether the current to the coil Wc is interrupted, and this will lead to a higher efficiency. Furthermore, the operating means D may be operated simply by applying alternating electric pulses to the coil Wc.

Reference is now made to FIGS. 2 through 5 to describe the construction and operation of an embodiment in which the movable one of the described two magnets is the permanent magnet.

Figure 2A:
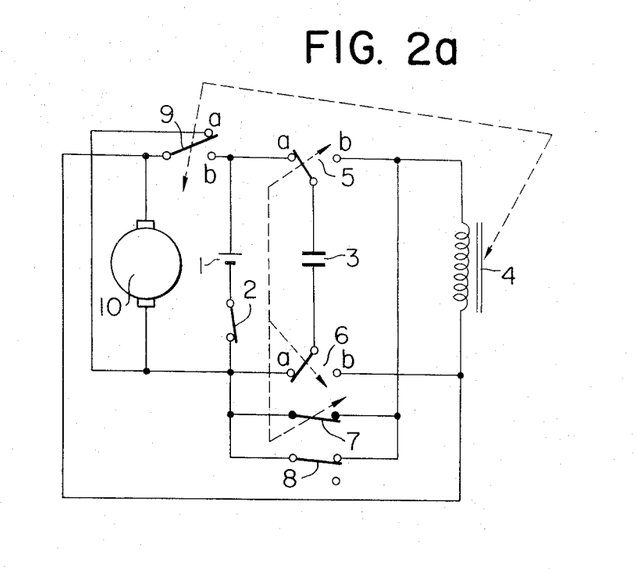
FIGS. 2a, 2b and 2c are a circuit diagram, a front view and a partial side view of the essential portion in this embodiment, and showing a position ready for photographing with the main switch closed.
Figure 2B:
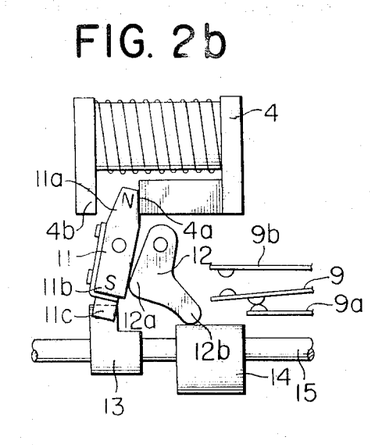
Figure 2C:
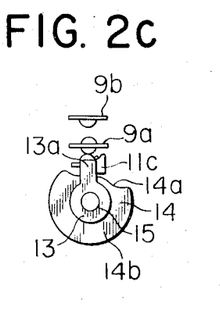

In FIG. 2a, the circuit includes a power source 1, a main power switch 2, a capacitor 3, an electromagnet 4, and release switches 5, 6 and 7. The release switches are such that when the switches 5 and 6 assume position a the other switch 7 is closed and when the switches 5 and 6 assume positions b the switch 7 is open. Parallel-connected with the release switch 7 is a change-over switch 8 adapted to close during a single-frame shot and to open during a continuous shot. A switch 9 for opening and closing the circuit of motor 10 is connected between the power source 1 and the motor 10 and actuated by the electromagnet 4. As shown more particularly in FIGS. 2b and 2c, the switch 9 has its movable contact selectively engaged with fixed contact 9a or 9b by a rockable member 12 which is rockable in counter-clockwise direction while keeping resilient contact with permanent magnet 11 by means of unshown spring, the permanent magnet 11 being pivotally movable in the space provided in the magnetic path of the electromagnet 4. One end 11b of the permanent magnet 11 which is remote from the electromagnet 4 is provided with a stopper 11c, which is cooperable with a stopper retaining member 13 to limit the pivotal movement of the permanent magnet 11. The rockable member 12 has one end 12b engageable with a cam 14. The stopper retaining member 13 and the cam 14 are both mounted on a shaft 15 which is driven to rotate at the same angular speed as the shutter shaft (not shown in FIGS. 2b and 2c) by the shutter shaft drive motor 10. In the normal stop position of the shutter shaft, i.e. in the position as shown in FIGS. 2b and 2c, the stopper 11c is in engagement with a projection 13a formed in a circumferential portion of the stopper retaining member 13 while the end 12b of the rockable member 12 is in engagement with a recessed portion 14a formed in the cam 14. The rockable member 12 is normally biased counter-clockwise, as viewed in FIG. 2b, by unshown spring, and one end 12a thereof bears against the adjacent side wall of the permanent magnet 11 to limit the counter-clockwise movement of the rockable member 12. The change-over switch 9 is such that its movable contact is engaged with its fixed contact 9a when the end 12b of the rockable member 12 is in engagement with the recessed portion 14a of the cam 14 and that its movable contact is engaged with its fixed contact 9b when the end 12b of the rockable member 12 is in engagement with the circular peripheral portion 14b of the cam 14.

The operation of the various parts will now be described in particular with reference to FIGS. 2-4 and FIG. 5.

Figure 3A:
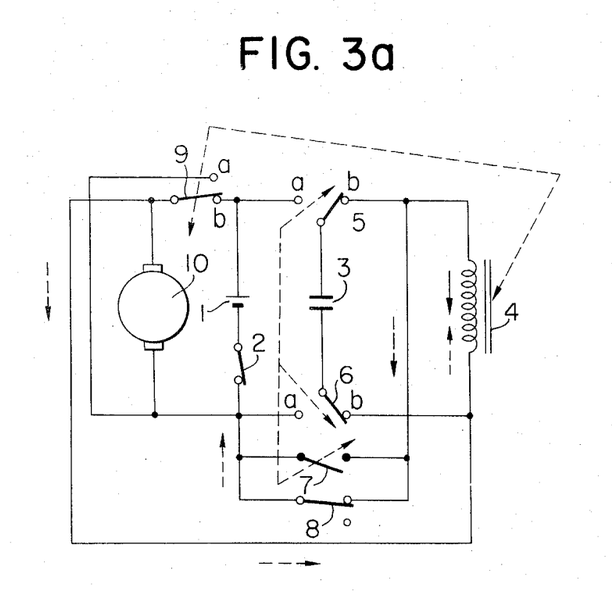
FIGS. 3a, 3b and 3c are similar to FIGS. 2a, 2b and 2c respectively, but showing a position where the release switch has been closed to release the stopper from its engaging member and start to rotate the drive motor.
Figure 3B:
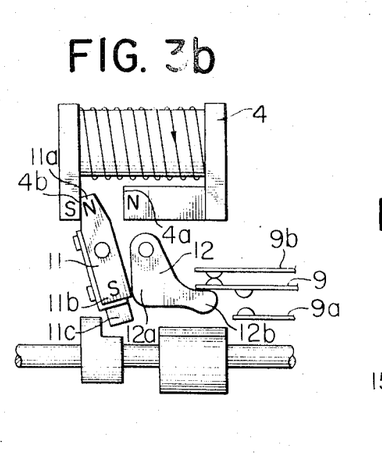
Figure 3C:
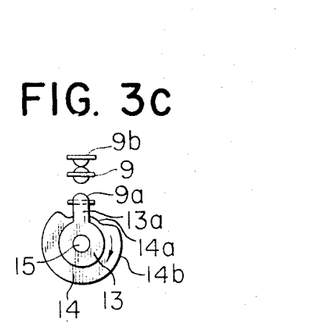

During a single-frame shot, the change-over switch 8 is in its ON position (see FIGS. 2a and 3a). When the main switch 2 is closed, the capacitor 3 is charged by the power source 1 since the movable contacts of the release switches 5 and 6 are then engaged with the fixed contacts a as shown in FIG. 2a. By that time, the shutter shaft has already been stopped at its normal stop position upon completion of the preceding shot, and as seen in FIG. 2b, the end 11a of the permanent magnet 11 has been attracted to the end face 4a of the electromagnet 4 while the stopper 11c is in engagement with the end 13a of the retaining member 13 and the end 12b of the rockable member 12 is in engagement with the recessed portion 14a of the cam 14. Therefore, the movable contact of the switch 9 is engaged with the fixed contact 9a and not with the fixed contact 9b. Subsequently, the shutter release button is drpressed to change over the release switches 5 and 6 from their contacts a to their contacts b and change over the switch 7 from its ON position to its OFF position (the position at $t=0$ in FIG. 5). Thus, the charge stored in the capacitor 3 is discharged to the coil on the electromagnet 4 so that a current flows in the direction as indicated by the solid-line arrow in FIG. 3a, whereby the electromagnet 4 is polarized as shown in FIG. 3b. Therefore, if the permanent magnet 11 is magnetized with its end 11a as N pole and its end 11b as S pole, the end 11a of the magnet 11 and the end 4a of the electromagnet 4 will repulse each other while the ends 11a and 4b will attract each other, whereby the permanent magnet 11 will pivot from the position of FIG. 2b to the position of FIG. 3b until its end 11a is stopped by the end 4b of the electromagnet 4 ($t=\tau_3$). Prior to this, during the pivotal movement of the magnet 11, the stopper 11c has already been disengaged from the projection 13a of the retaining member 13 ($t=\tau_1$), whereafter the movable contact of the switch 9 is engaged with the fixed contact 9b by means of the rockable member 12 ($t=\tau_2$), so that the shutter shaft drive motor circuit is closed to cause the shutter blade to begin rotating ($\theta=0$) and at the same time the shaft 15 begins rotating at a speed ratio of 1 : 1 with respect to the shutter shaft, whereupon the retaining member 13 and cam 14 also begin to rotate with the shaft 15. The discharging capacity of the capacitor is preset such that the discharging time is $t=0 - \tau_3$. Since the cam 14 begins to rotate in the direction of arrow in FIG. 3c as soon as the motor 10 begins rotating, the end 12b of the rockable member 12 rides on the circular peripheral portion 14b of the cam 14 to maintain the movable contact of the switch 9 in engagement with the fixed contact 9b until the end 12b reaches the recessed portion 14a of the cam 14, thereby allowing the motor 10 to continue its rotation and accordingly allowing the shutter shaft to continue its rotation at a predetermined speed from $\theta=0$ in FIG. 5.

Figure 4A:
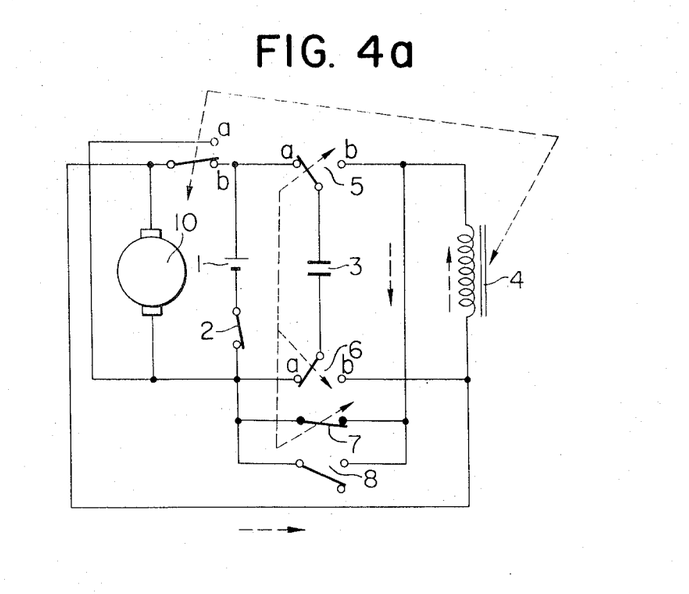
FIGS. 4a, 4b and 4c are also similar to FIGS. 2a, 2b and 2c respectively, but showing a position where the release switch has been opened.
Figure 4B:
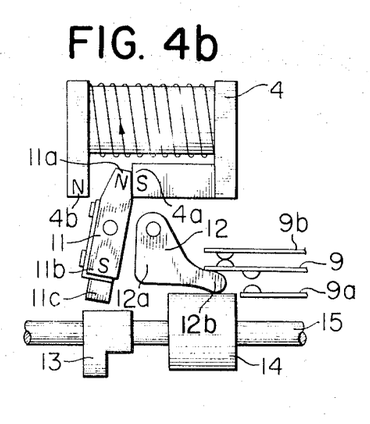
Figure 4C:
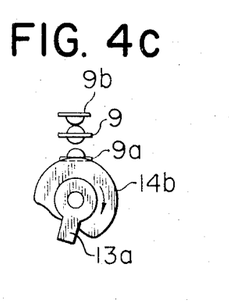
Figure 5:
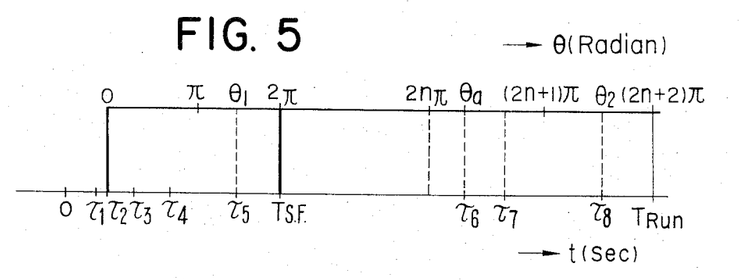
FIG. 5 is a graph illustrating the actions of various parts of the device with the abscissa representing time and the ordinate representing the angle of rotation of the shutter shaft.

On the other hand, independently of the discharge circuit of the capacitor 3, a current flows in the direction as indicated by imaginary arrow in FIG. 3a, after the point of time $t=\tau_2$, because of the movable contact of the switch 9 engaged with the fixed contact 9b. At the point of time $\tau_2$, almost all of the charge in the capacitor 3 has been discharged to leave only a very small quantity of current flowing in the direction of solid-line arrow. Therefore, the polarity of the electromagnet 4 is changed as shown in FIG. 4b and the permanent magnet 11 is allowed to return to its position of FIG. 4b, i.e. the position where the stopper 11c is engaged with the projection 13a of the retaining member 13. By that time, however, the end 12b of the rockable member 12 has ridden on the circular peripheral portion 14b of the cam 14 to restrict the counter-clockwise rotation of the rockable member, and thus this rockable member maintains the movable contact of the switch 9 in engagement with the fixed contact 9b until the end 12b reaches the terminus of the circular peripheral portion 14b of the cam 14. Accordingly, the rotation of the motor 10 continues until the end 12b of the rockable member 12 comes into the recessed portion 14a of the cam 14 to change over the movable contact of the switch 9 into engagement with the fixed contact 9a. When the end 12b has come into the recessed portion 14a ($t=\tau_5$, at which the shutter shaft has been rotated to an angle $\theta_1$), the aforesaid change-over of the switch 9 not only closes the circuit of the motor 10 but also forms a short circuit as shown in FIG. 2a, whereby the rotational energy of the motor is well consumed to provide a very good brake and minimize the shock between the stopper 11c and the retaining portion 13a of the retaining member 13, as compared with the case where no short circuit is formed in the motor 10.

It will thus be appreciated that a single depression of the release button enables not only a single-frame shot to take place but also the shutter shaft to stop at its normal position ($t=T_{S.F.}$, $\theta=2\pi$).

To accomplish a continuous shot, the change-over switch 8 is brought to its OFF position in FIG. 2a. The release button is depressed to change over the release switches from their contacts a to their contacts b and the switch 7 is closed ($t=0$), so that the electromagnet 4 is magnetized by the discharge current from the capacitor 3 to pivotally move the permanent magnet 11, as shown in FIG. 3b, whereafter the stopper 11c is disengaged from the retaining member 13 ($t=\tau_1$) and then the movable contact of the switch 9 engages the fixed contact 9b to close the motor circuit ($t=\tau_2$). From then till the point of time $t=\tau_3$, the same operation occurs as that described above with respect to the single-frame shot. That is, the capacitor 3 discharges to pass a current to the electromagnet 4 in the direction of solid-line arrow in FIG. 3a until the point of time $t=\tau_3$ is reached. In this case, however, the switch 8 is open and therefore, no current flows in the direction of the imaginary arrow, despite the engagement between the movable contact and fixed contact 9b of the switch 9 resulting from the permanent magnet 11 attracted to the electromagnet 4. Thus, the stopper 11c is maintained in the position as shown in FIG. 3a, whereby the motor 10 is allowed to continue its rotation to continuously drive the shutter blade for a continuous shot.

To terminate the shot, the release button is released from its depressed position to change over the release switches 5 and 6 from their contacts b to their contacts a and close the switch 7 ($t=\tau_6$, $\theta=\theta_a$). Thereupon, a current flows in the direction indicated by the imaginary arrow in FIG. 4a to cause mutual attraction between the end 4a of the electromagnet 4 and the end 11a of the permanent magnet 11 and mutual repulsion between the end 4b of the electromagnet and the said end 11a of the permanent magnet, whereby the permanent magnet 11 is attracted into engagement with the end 4a of the electromagnet to return the stopper 11c into engagement with the projection 13a of the retaining member 13 ($t=\tau_7$). Nevertheless, the drive motor maintains its rotation because the switch 9 maintains its movable contact in engagement with its fixed contact 9b as long as the end 12b of the rockable member 12 is engaged with the circular peripheral portion 14b of the cam 14. Thereafter, the end 12b of the rockable member 12 comes into the recessed portion 14a of the cam 14 ($t=\tau_8$, $\theta=\theta_2$), so that the movable contact of the switch 9 shifts from the contact 9b to the contact 9a to open the motor circuit and form a short circuit in the same way as described previously with respect to the single-frame shot. Thus, the shaft 15 now rotates due to its inertia to bring the projection 13a of the retaining member 13 thereon into engagement with the stopper 11c until the shutter shaft associated with the rotary shaft 15 is stopped at its normal stop position.

FIGS. 6 to 11 show further embodiments of the electromagnetic shutter releasing device according to the present invention, wherein use is made of a stationary permanent magnet, a stationary electromagnet, movable ferromagnetic members magnetized by the stationary electromagnet and co-acting with the electromagnet, and a switch changed over to open and close the shutter shaft drive motor upon detection of the movement of the ferromagnetic members.

Figure 6A:
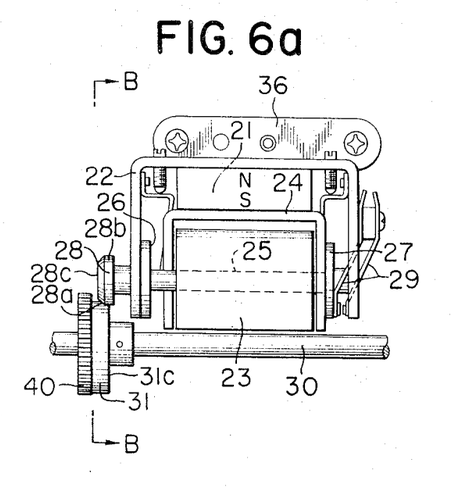
FIG. 6a is a front view of the essential portion of the device when the stopper is in engagement with the cam.
Figure 7A:
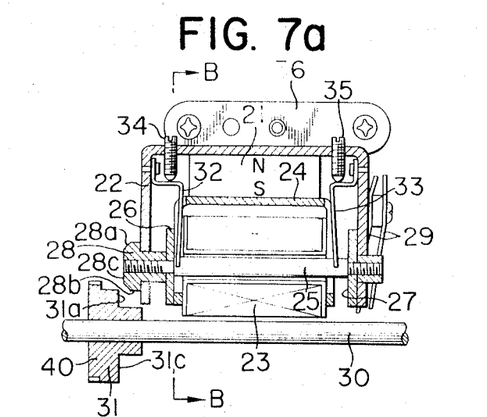
FIG. 7a is a longitudinal sectional view of the essential portion when the stopper is out of engagement with the cam.

In FIGS. 6a and 7a, a permanent magnet 21 is attached to a first yoke 22 and an electromagnet coil 23 is mounted on a second yoke 24. The permanent magnet 21 and the second yoke 24 are closely joined together to provide a magnetic path. A slidable rod 25 is slidably supported by the first and second yokes 22 and 24 and also acts as the core for the electromagnet 23. The slidable rod 25 has a pair of ferromagnetic members 26, 27 secured thereto and interposed between the two yokes 22 and 24. A stopper 28, which includes a ramp portion 28a, a stepped portion 28b and an end face 28c, is provided at one end of the slidable rod 25. A switch 29 is provided to open and close a motor circuit for driving the unshown shutter shaft of a motion picture camera. A rotary shaft 30 is associated with the unshown shutter shaft for rotation therewith at a speed ratio of 1 : 1. The shaft 30 carries thereon a cam 31 including a recessed portion 31a, a circular peripheral portion 31b and an end face 31c. The electromagnetic releasing device thus constructed may be mounted to a motion picture camera body by means of a plate 36.

Figure 6B:
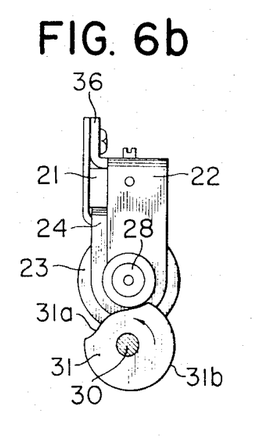

FIG. 6 shows a position in which the stopper 28 is engaged with the can 31 to open the switch 29 with no current flowing to the electromagnet 23 while the ferromagnetic members 26, 27 are attracted into engagement with the first and second yokes 22, 24 respectively to lock the shaft 30. This position is the stop position of the shutter shaft and blade. In such position, if a current is flowed to the electromagnetic coil 23 in a direction for magnetizing the ferromagnetic members 26, 27 as poles N and S respectively, then mutual repulsion will occur between the ferromagnetic member 26 and the first yoke 22 and between the ferromagnetic member 27 and the second yoke 24, respectively, whereby the slidable rod 25 will be displaced in a direction for closing the switch 29 and will thus close this switch when the stepped portion 28b of the stopper has been disengaged from the end face 31c of the cam 31 but the ramp portion 28a of the stopper 28 will still be in engagement with the cam end face 31c. Thus, the motor (not shown) will be energized to drive the cam shaft 30 for rotation.

Figure 7B:
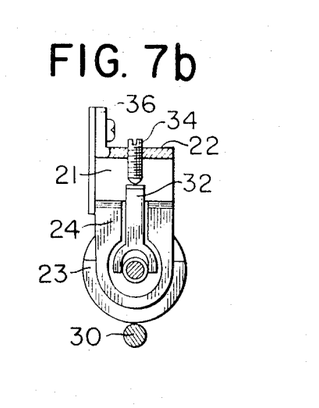

On the other hand, the slidable rod 25 will further move until the ferromagnetic members 26, 27 are attracted into engagement with the yokes 24, 22, thus attaining the position as shown in FIG. 7. Even if the current to the electromagnet coil 23 is then cut off, the slidable rod 25 will be maintained in its position of FIG. 7 by the attraction acting between the ferromagnetic members 26, 27 and the yokes 24, 22.

When a current is flowed to the electromagnetic coil 23 in the opposite direction, the ferromagnetic members 26 and 27 will be magnetized with opposite polarities to those shown in FIG. 6, so that mutual repulsion will occur between the ferromagnetic members 26, 27 and the yokes 24, 22 to cause the slidable rod 25 to move in the direction for opening the switch 29. By that time, however, the circular peripheral portion 31b of the cam 31 has usually become ready for engagement with the stopper 28 and therefore, the left end face 28c of the stopper 28 will first engage the right end face 31c of the cam 31 even if the stopper is moved back or leftwardly as viewed in the figure. In this position, the switch 29 has not been opened yet. When the cam 31 is rotated in the direction as indicated by arrow in FIG. 6b to bring its recessed portion 31a into a position for engagement with the stopper 28, the stopper 28 which is chamfered at the portion defining the end face 28c will further move back or leftwardly until its ramp 28a is engaged with the recessed portion 31a of the cam 31, whereupon the switch 29 will be opened to form an open motor circuit, thereby electrically deenergizing the motor. Nevertheless, the motor will continue its rotation due to its inertia until the stepped portion 28b of the stopper 28 is engaged with the recessed portion 31a of the cam 31 to stop the rotation of the cam shaft 30, thus restoring the position as shown in FIG. 6.

A single-frame shot may be achieved when the above-described operations are carried out in a sequence. Also, a continuous shot may be achieved when a current continues flowing through the motor circuit while the stopper is maintained out of engagement with the cam 31. In the latter case, as in the case of a single-frame shot, the termination of the shot may be accomplished by passing a current of the opposite polarity to the electromagnet coil 23 to stop the shutter shaft at its normal stop position.

During such operation, the attraction of the permanent magnet 21 may tend to cause so intimate contact between the ferromagnetic members 26, 27 and the yokes 22, 24 that it will be difficult to release such contact with the aid of the electromagnetic force of the electromagnet alone. For this reason, it is desirable to provide springs 32, 33 for imparting resilient forces in such directions as to negate the strong attractions acting between the ferromagnetic members 26, 27 and the yokes 22, 24. Adjust screws 34, 35 may be provided to adjust the resilient forces of such springs 32, 33.

Figure 8A:
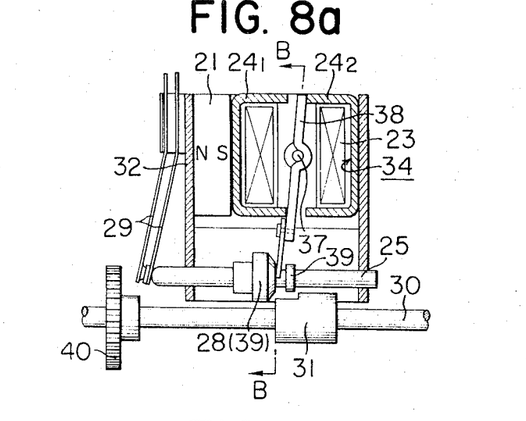
FIG. 8a is a longitudinal section showing a modified form of the device according to the present invention.
Figure 8B:
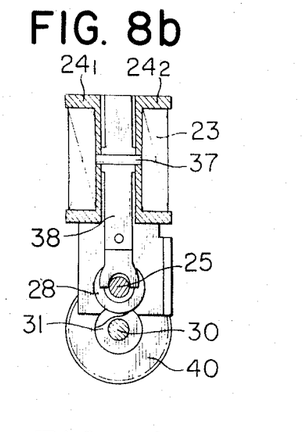

FIGS. 8a and 8b show a further modification of the present invention, in which the second yoke 24 comprises a pair of yoke members $24_1$ and $24_2$ disposed with their open ends facing each other and a rockable member 38 is pivoted at a fulcrum 37 located at the center of the yoke 24 and has one end portion disposed between the flanges 39 and 39 of a slidable rod 25. In FIG. 8, one of such flanges 39 is shown as being provided by the stopper 28.

The rockable member 38 may be rotated about the fulcrum 37 in either direction depending on the direction of the current flowing to the electromagnet coil 23, thereby moving the slidable rod 25 rightwardly or leftwardly, as viewed in FIG. 8a, to control the opening and closing of the switch 29 in the same way as described with respect to FIGS. 6 and 7. When the rockable member 38 is rotated until its opposite ends are attracted into engagement with the opening edges of the yoke members $24_1$ and $24_2$, the rockable member 38 retains the slidable rod. Thus, the arrangement of FIG. 8 eliminates the need to provide the ferromagnetic members 26, 27 as shown in the embodiment of FIGS. 6 and 7. The stopper 28 and the cam 31 as well as the entire device are the same in operation as those described previously, and these need not be described further.

In the embodiment described so far, the shaft 30 may be arranged for rotation in either of the normal and reverse directions. In FIGS. 6 to 8, reference numeral 40 designates a gear for connecting the cam shaft 30 to the drive motor shaft. In the embodiments of the described type, the permanent magnet is actuated in accordance with the direction of the current flowing to the electromagnet so that the switch for opening and closing the shutter shaft drive motor circuit is changed over by the slidable rod moving between its first and second positions, whereupon the slidable rod is attracted and retained at either of these positions (i.e. the stop end positions) by the permanent magnet. Accordingly, current must be flowed to the electromagnet coil only when the slidable rod is to be actuated, and no holding current must be flowed once the slidable rod is actuated. This also holds true with the embodiment of FIGS. 2–4. In this way, the device according to these embodiments may minimize the power consumption and is very effective as the electromagnetic shutter releasing device for opening and closing the motor circuit in a motion picture camera which is compelled to use a compact power source of small capacity.

Figure 9:
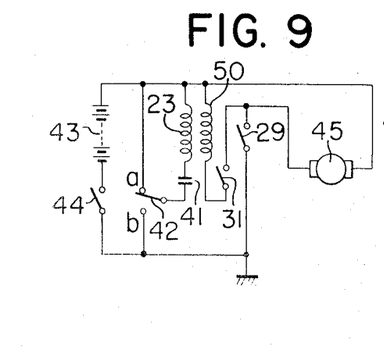
FIG. 9 shows an example of the electric circuit in the electromagnetic shutter releasing device shown in FIGS. 6–8.
Figure 10:
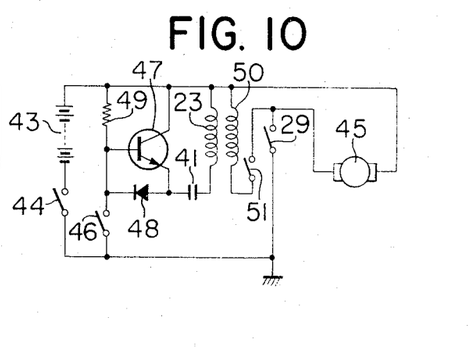
FIG. 10 shows another example of the electric circuit.
Figure 11:
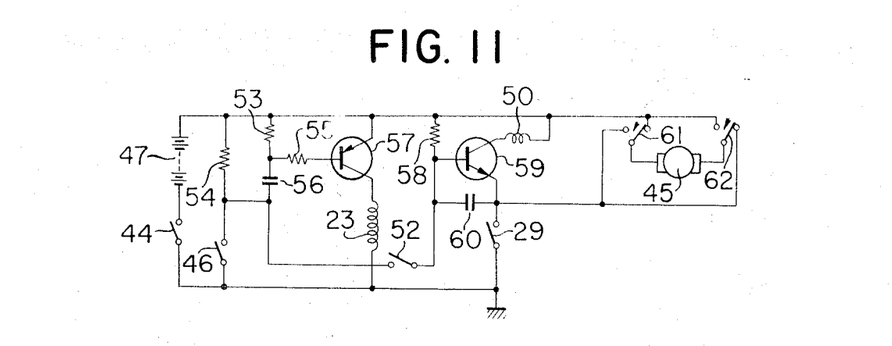
FIG. 11 shows still another example of the electric circuit.

FIGS. 9 to 11 illustrate some examples of the electric circuit through which currents of opposite polarities may alternately flow to the electromagnet coil 23.

In the circuit of FIG. 9, a serial connection of electromagnet coil 23, capacitor 41 and release switch 42 is parallel-connected with a power source 43. When power switch 44 is closed to change over the release switch 42 from its contact $a$ to its contact $b$, the current charged in the capacitor 41 will flow to the electromagnet coil 23 to cause the slidable rod 25 to close switch 29 and accordingly close the circuit of motor 45. If the release switch 42 is then changed over from its contact $b$ to its contact 2, the charge from the capacitor 41 will flow through the electromagnet coil 23 in the opposite direction, thereby moving back the slidable rod 25 to close the switch 29.

The circuit arrangement shown in FIG. 10 includes an ordinary switch 46 adopted as release switch, instead of the change-over switch 42, a transistor 47 parallel-connected with the electromagnet coil 23 and capacitor 41, a diode 48 inserted between the base and emitter of the transistor and a resistor 49 inserted between the base and collector of the transistor. When the release switch 46 is closed, the capacitor 41 will be charged through the electromagnet coil 23 so that the slidable rod 25 will be moved similarly to the case of FIG. 9, thereby closing the switch 29. When the release switch 46 is opened, the transistor 47 will be rendered conductive by the charge current from the capacitor 41, which will thus discharge through the circuit 41-2-3-47-41. Thereupon, the attraction of the electromagnet will act to move the slidable rod 25 so as to open the switch 29 and accordingly open the motor circuit.

In FIGS. 9 and 10, a coil 50 wound with the opposite polarity to that of the coil 23 is provided to effect a single-frame shot. Preferably, the coil 50 is wound at the same location as the coil 23. If switch 51 for switching the mode of photographing between the single-frame shot and the continuous shot is closed to bring the movable contact of the release switch 42 into engagement with the fixed contact $b$ (or, in FIG. 10, to close the release switch 46), a current will flow in the coil 23 so that interaction between the electromagnet and the permanent magnet will cause the slidable rod 25 to be mechanically moved and thereby close the switch 29. As the result, a current will also flow in the motor 45 and coil 50. The length of time during which the current continues flowing in the coil 23 is limited to the charging time of the capacitor 41, but the slidable rod 25 for holding the switch 29 in its ON position may be maintained in its operative position by the attraction acting between the ferromagnetic member or the ferromagnetic rockable member and the permanent magnet. However, since the closed switch 29 causes a current of the opposite polarity to begin flowing in the coil 50 and coil 23, the electromagnet will be oppositely polarized if the current of the opposite polarity increases its quantity, whereby the movable ferromagnetic member tends to restore its initial position and actuate the slidable rod 25 so as to bring the stopper 28 integral therewith into engagement with the cam 31. Thus, the closed switch 29 will now be opened to deenergize the motor and stop the shutter shaft at its predetermined position. This completes one cycle of single-frame shot.

FIG. 11 shows another example of the circuit arrangement in which coils 23 and 50 pass a current therethrough only in one direction. When the switch 52 is open, a single-frame shot can be effected in the manner to be described, in accordance with the above-described principle. If the release switch 46 is closed, base current of transistor 57 will flow and current will thus flow to the coil 23 until capacitor 56 is charged, whereupon the engagement between the stopper 28 and the cam 31 is mechanically released to allow the slidable rod 25 to move and close the switch 29, thereby admitting a current into the motor 45. At the same time, capacitor 60 begins to be charged through resistor 58 and when this charging is finished, base and collector currents of another transistor 59 begin to flow and thus, a current of the opposite polarity to that of the current flowing in the coil 23 will flow in the coil 50. As the result, the slidable rod 25 will move back to its initial position in the described manner, thereby mechanically engaging the stopper 28 with the cam 31 and opening the switch 29 to deenergize the shutter shaft drive motor 45.

If the switch 52 is then closed, a continuous shot will be enabled to take place in the manner described hereunder. After the release switch 46 is closed and until the switch 29 is closed to energize the motor 45, the operation will occur in the same way as described above with respect to the single-frame shot. Thereafter, the release switch 46 is maintained in its closed position to allow all the current flowing in the resistor 58 to pass through the switch 52 and release switch 46, and thus the capacitor 60 will not be charged despite the closed position of the switch 29. Accordingly, the base potential of the transistor 59 will be zero volt and this transistor will not conduct any current to the coil 50. In this way, a continuous shot will continue with the release switch 46 maintained in its ON position. When the release switch 46 is opened, the capacitor 60 will be charged through the resistor 58 to turn on the transistor 59, which thus conducts a current to the coil 50. Accordingly, the slidable rod 25 will be moved back to open the switch 29 to deenergize the shutter shaft drive motor 45 while bringing the stopper 28 integral with the slidable rod 25 into mechanical engagement with the cam 31 integral with the cam shaft connected to the shutter shaft. Thus, the shutter shaft is stopped at its predetermined stop position, whereupon the continuous shot is terminated. Resistors 53 and 54 are those through which the capacitor 56 may discharge, and switches 61 and 62 are transfer switches for changing over the rotation of the motor 45 between the normal and reverse directions.

FIG. 12 illustrates a conventional motion picture camera body 100 which incorporates therein the described electromagnetic shutter releasing device of the present invention. The permanent magnet is designated by 21, and the electromagnet is comprised of coils 23 and 50 of the opposite polarities. Stopper 28, cam shaft 30, cam 31, gears 40 and drive motor 45 are the same as those shown and described above. An idler 70 is provided to transmit the rotation of the motor 45 to the shutter shaft 71, which has a shutter blade 72 securely mounted thereon. The idler 70 and the shutter blade 72 are rotatable in the directions as indicated by respective arrows when a gear 73 on the motor shaft is dirven to rotate in the direction of arrow. A magazine 74 contains therein a roll of film 75. The shutter blade 72, when rotated, controls the time during which the film is exposed through a film aperture 76. Light enters through a zoom lens 77 in the direction as indicated by a chain-line arrow and is partly directed through a relay lens 78 to the film aperture 76 and partly directed upwardly and the horizontally to a viewfinder. A worm gear 79 is provided to transmit the rotation of the cam shaft via worm wheel 80 to a film take-up gear 81. The take-up gear 81 may be rotated in the direction of arrow to take up the film when the motor 45 is rotating in the direction of arrow. Numeral 82 designates a shutter release button which may be depressed to actuate the release switch (not shown in FIG. 12).

The present invention, as described above, utilizes the charging and discharging currents of a capacitor to alternately flow a current through an electromagnet coil in opposite directions and this only requires a very simple circuit arrangement to achieve the intended purposes. Furthermore, the charging and discharging currents of the capacitor flow so abruptly at the intial stage of the charging and the discharging cycle as to ensure positive energization of the electromagnet and positive attraction or repulsion between the electromagnet and the permanent magnet or the ferromagnetic members, thereby enabling the shutter shaft drive motor to start and stop accurately. Moreover, switch means may be operated to allow the drive motor to continue its rotation with the aid of the permanent magnet alone but without any current flowing to the electromagnet, and thus both a single-frame shot and a continuous shot may be accomplished with a minimum power consumption in the motion picture camera.

We claim:
1. In an electromagnetic shutter release control device for use with a motion picture camera, a combination comprising:
  shutter means rotatable from a predetermined position for exposing a film;
  driving means for rotatably driving said shutter means;
  power supplying means operatively connected to said driving means for supplying electric energy thereto;
  release switch means movable between an OFF position and an ON position for operating the camera;
  switching means arranged between said driving means and said power supplying means for connecting and disconnecting said driving means with said power supplying means to permit the selective supply of electric energy to said driving means;
  a movable member operatively engageable with said switching means for actuating said driving means;
  actuating means for actuating said movable member to activate said switching means, said actuating means including permanent magnet means, a pair of coils wound around a soft magnetic material and electromagnet means, and said electromagnet means, when energized by said power supplying means, actuating said movable member by interaction between the electromagnetic field produced by said electromagnet means and the magnetic field by said permanent magnet means;
  blocking means actuatable by said actuating means and engageable with at least a portion of said shutter means to fix the shutter means at a predetermined position thereof, and having a first rest position for stopping the movement of said shutter means and a second rest position for releasing the movement of the shutter means; and
  power supply control circuit means including a first circuit which when the camera is continuously shooting, provides, in response to the turning of said release switch from OFF position to ON position, the electric current supply to the first coil of said electromagnet during a predetermined time from the turning operation, and a second circuit which provides, in response to the turning of said release switch from ON position to OFF position, the electric current supply to the second coil of said electromagnet during a predetermined time from the turning from ON position to OFF position, thereby disconnecting the power supply from said power supplying means to said actuating means during continuous shooting;

said blocking means being moved, when continuously shooting, into said second rest position thereof by the movement of said movable member, and being maintained at said second rest position even after the electric power supply from said power supplying means is stopped by said control circuit means, thereby permitting the continuous operation of said shutter means.

2. A combination as defined in claim 1, wherein said movable member maintains said switch means in said connecting condition when said shutter means is not positioned at said predetermined position thereof.

3. In a photographic camera capable of continuous shooting, a combination comprising:

shutter means rotatable from a predetermined position for exposing a film;

said shutter means including a rotatable shutter blade and a shutter shaft for rotatably supporting said blade thereon, driving means for rotatably driving said shutter means, power supplying means operatively connected to said driving means for supplying electric energy thereto;

switching means arranged between said driving means and said power supplying means, said switching means connecting and disconnecting said driving means with said power supplying means to permit the selective supply of electric energy to said driving means;

actuating means for actuating said driving means through said switching means, said actuating means including permanent magnet means, electromagnetic means and control means for controlling the electric energy supply to the electromagnetic means;

and blocking means actuatable by said actuating means and engageable with at least a portion of said shutter means to fix the shutter means at a predetermined position thereof, and having a first rest position for stopping the movement of said shutter means and a second rest position for releasing the movement of the shutter means;

said blocking means being moved, when continuous shooting, into said second rest position thereof, and being maintained at said second rest position even after the electric energy supply from said power supplying means is stopped by said control means, thereby permitting the continuous operation of said shutter means.

4. In a photographic camera capable of continuous shooting, a combination comprising:

shutter means rotatable from a predetermined position for exposing a film;

driving means for rotatably driving said shutter means, said driving means including a reversible drive motor and a member for transmitting the drive of said motor to said shutter means, power supplying means operatively connected to said driving means for supplying electric energy thereto;

switching means arranged between said driving means and said power supplying means, said switching means connecting and disconnecting said driving means with said power supplying means to permit the selective supply of electric energy to said driving means;

actuating means for actuating said driving means through said switching means, said actuating means including permanent magnet means, electromagnetic means and control means for controlling the electric energy supply to the electromagnetic means;

and blocking means actuatable by said actuating means and engageable with at least a portion of said shutter means to fix the shutter means at a predetermined position thereof, and having a first rest position for stopping the movement of said shutter means and a second rest position for releasing the movement of the shutter means;

said blocking means being moved, when continuous shooting, into said second rest position thereof, and being maintained at said second rest position even after the electric energy supply from said power supplying means is stopped by said control means, thereby permitting the continuous operation of said shutter means.

5. In a photographic camera capable of continuous shooting, a combination comprising:

shutter means rotatable from a predetermined position for exposing a film;

driving means for rotatably driving said shutter means, power supplying means operatively connected to said driving means for supplying electric energy thereto;

said power supplying means including a storage battery, switching means arranged between said driving means and said power supplying means, said switching means connecting and disconnecting said driving means with said power supplying means to permit the selective supply of electric energy to said driving means;

actuating means for actuating said driving means through said switching means, said actuating means including permanent magnet means, electromagnetic means and control means for controlling the electric energy supply to the electromagnetic means;

and blocking means actuatable by said actuating means and engageable with at least a portion of said shutter means to fix the shutter means at a predetermined position thereof, and having a first rest position for stopping the movement of said shutter means and a second rest position for releasing the movement of the shutter means;

said blocking means being moved, when continuous shooting, into said second rest position thereof, and being maintained at said second rest position even after the electric energy supply from said power supplying means is stopped by said control means, thereby permitting the continuous operation of said shutter means.

6. In an electromagnetic shutter release control device for use with a motion picture camera, a combination comprising:

shutter means rotatable from a predetermined position for exposing a film;
driving means for rotatably driving said shutter means;
power supplying means operatively connected to said driving means for supplying electric energy thereto;
release switch means movable between an OFF position and an ON position for turning the camera into operating condition in response to a shutter releasing operation of said camera;
switching means arranged between said driving means and said power supplying means for connecting and disconnecting said driving means with said power supplying means to permit the selective supply of electric energy to said driving means;
a movable member operatively engageable with said switching means for actuating said driving means;
actuating means for actuating said movable member to activate said switching means, said actuating means including permanent magnet means and electromagnet means, and said electromagnet means, when energized by said power supplying means, actuating said movable member by interaction between the electromagnetic field provided by said electromagnet means and the magnetic field by said permanent magnet means;
blocking means actuatable by said actuating means and engageable with at least a portion of said shutter means to fix the shutter means at a predetermined position thereof, and having a first rest position for stopping the movement of said shutter means and a second rest position for releasing the movement of the shutter means; and
an electromagnetical control circuit controlling the direction of the current through said electromagnetic means so that when said blocking means is moved from said first rest position thereof to said second rest position thereof, the current flows through said electromagnetic means in a first direction, and when said blocking means is moved from said second rest position thereof to said first rest position thereof, the current flows through said electromagnetic means in a second direction opposite to said first direction, thereby changing the polarity of the magnetic poles of said electromagnetic means;
said blocking means being moved, when continuously shooting, into second rest position thereof by the movement of said movable member, and being maintained at said second rest position even after the electric power supply from said power supplying means is stopped by said control circuit means, thereby permitting the continuous operation of said shutter means.

7. A combination as defined in claim 1, wherein said blocking means includes a stopper member movable by the interaction of said permanent magnet means and said electromagnetic means engageable with at least a portion of said shutter means.

8. A combination as defined in claim 1, wherein said shutter means includes a cam member engageable with said blocking means for stopping the shutter means precisely at said predetermined position.

9. A combination as defined in claim 6, wherein said electromagnetic means further comprises two coils wound substantially at the same place for flowing a respective opposite-directional current therethrough to magnetize said electromagnetic means.

10. In an electromagnetic shutter release control device for use with a motion picture camera, a combination comprising:
shutter means rotatable from a predetermined position for exposing a film;
driving means for rotatably driving said shutter means;
power supplying means operatively connected to said driving means for supplying electric energy thereto;
switching means arranged between said driving means and said power supplying means for connecting and disconnecting said driving means with said power supply means to permit the selective supply of electric energy to said driving means;
release switch means movable between an OFF position to an ON position for operating the camera;
a movable member operative engageable with said switching means for actuating said driving means;
actuating means for actuating said driving means through said switching means, said actuating means including permanent magnet means and electromagnetic means having a pair of coils wound around a soft magnetic material, and said electromagnet means, when energized by said power supplying means, actuating said movable member by interaction between electromagnetic field provided by said electromagnet means and magnetic field by said permanent magnet means;
blocking means actuatable by said actuating means and engageable with at least a portion of said shutter means to fix the shutter means at a predetermined position thereof, and having first rest position for stopping the movement of said shutter means and second rest position for releasing the movement of the shutter means; and
control circuit means including a first capacitor-resistor combination, a first transistor for adjusting the supplying time of electric current to one of said coils, the input voltage of said first transistor being controlled by said first capacitor-resistor combination, a second capacitor-resistor combination and a second transistor for adjusting the supplying time of the electric current to another one of said coils, the input voltage of said second transistor being controlled by said second capacitor-resistor combination;
said blocking means being moved, when continuous shooting, into said second rest position thereof by energization of said first coil, and being maintained at said second rest position even after the electric energy supply from said power supplying means is stopped by said control circuit means, thereby permitting the continuous operation of said shutter means.

11. In an electromagnetic shutter release control device for use with a motion picture camera, a combination comprising:
shutter means rotatable in either direction from a predetermined position for exposing a film;
driving means for rotatably driving said shutter means;
power supplying means operatively connected to said driving means for supplying electric energy thereto;

switching means arranged between said driving means and said power supplying means, said switching means connecting and disconnecting said driving means with said power supplying means to permit the selective supply of electric energy to said driving means;

electromagnet means for selectively actuating said switching means for energizing said driving means in response to a shutter rlease operation of said camera;

control circuit means for controlling said electromagnet means, said control circuit means including a pair of capacitor-resistor combinations, a pair of transistors, the input voltages of said transistors being controlled by said capacitor-resistor combinations, respectively, and selector switch means for controlling the introduction of said pairs into said circuit; and blocking means actuatable by said electromagnet means through said control circuit means for blocking said shutter means in either rotational direction thereof, said blocking means having a first rest position for maintaining said switching means at non-actuated condition thereof and stopping the rotational movement of said driving means in either direction, and a second rest position for maintaining said switching means at actuated condition thereof and releasing the rotational movement of said driving means in either direction, said blocking means further comprising a movable portion which is movable into and out of at least a portion of the locus of the rotation of said shutter means , said shutter means having a rotatable portion engageable with said movable portions, thereby stopping the rotational movement of said shutter means in either direction when said two portions are moved to engage each other.

12. In an electromagnetic shutter release control device for use with a motion picture camera, a combination comprising:

shutter means rotatable from a predetermined position for exposing a film;

driving means for said shutter means;

power supplying means operatively connected to said driving means for supplying electric energy thereto;

switching means arranged between said driving means and said power supplying means for connecting and disconnecting said driving means with said power supplying means to permit the selective supply of electric energy to said driving means;

electromagnetic means for controlling said driving means through said switching means;

engaging means rotatable integrally with said shutter means;

blocking means including a first movable member and a second movable member; and control circuit means having a timing circuit for controlling the energization of said electromagnetic means, said control circuit means permitting, when said switching means is changed from a first position thereof to a second position thereof, electric current through said electromagnet means in the direction to actuate said first movable member, and while said second switch is subsequently maintained at said second position thereof, stopping said electric current through said electromagnet means after an elapse of time determined by said timing circuit, and when said switching means is returned from said second position to said first position, permitting electric current through said electromagnet means in the direction opposite to said direction.

13. In a motion picture camera, an electromagnetic shutter releasing device for electromagnetically releasing a movable shutter from its rest position to expose a film through an aperture and for stopping the shutter at a predetermined position at the end of the exposure, said device comprising:

shutter means;

driving means for said shutter means;

power supplying means operatively connected to said driving means for supplying electric energy thereto;

switching means arranged between said driving means and said power supplying means, said switching means connecting and disconnecting said driving means with said power supplying means to permit the selective supply of electric energy to said driving means;

electromagnetic means connected to said power supplying means through said switching means and magnetizable with opposite polarities in response to the changes in the direction of the current through said electromagnetic means;

permanent magnet means located adjacent said electromagnetic means to interact with the electromagnetic means;

controlling means for controlling the movement of said shutter means, said controlling means having a member movable by the interaction of said electromagnetic means and permanent magnet means, said movable member being movable between a first position for stopping the rotational movement of said shutter means and a second position for permitting the rotational movement of said shutter means; and said movable member being moved, when continuous shooting, into said second position thereof, and being maintained at said second position even after the electric energy supply from said power supplying means is stopped, thereby permitting the continuous operation of said shutter means, adjusting means operatively connected to said movable member for adjusting the attracting force caused by the interaction of said electromagnetic means and said permanent magnet means, said adjusting means including an adjustably contacting member to said movable member, and a setting member to adjustably set said contacting member thereby to enable said electromagnet means to move said movable member only supplying a small current to the electromagnetic means.

14. In an electromagnetic shutter release device for use with a motion picture camera being selectively capable of a single frame exposure and a continuous filming, said device having at least one magnetic circuit including a permanent magnet and an electromagnet, an improvement comprising:

permanent magnet means;

electromagnet means interacting with said permanent magnetic means;

power supplying means for actuating said electromagnet means;

movable means driven by the magnetic interaction of said permanent magnet means and said electromagnet means,;

shutter release means movable between a first position for releasing the shutter and a second position for stopping the shutter;

said movable means having a first position for maintaining said shutter release means in its second position for stopping the shutter and a second position for releasing said shutter release means to release the shutter, said movable means being moved, when continuous shooting, into said second position thereof, and being maintained at said second position even after the electric energy supply from said power supplying means is stopped, thereby permitting the continuous operation of said shutter, switch means actuatable by said movable means when the latter is positioned at its extreme position; and adjusting means for reducing the interaction forces of said electromagnet means and said permanent magnet means, said adjusting means including two independently operable adjusting members, one of which operates to reduce the attractive force between said two magnet means in a direction in which said switch means is actuated and the other of which operates to reduce the attractive force in the opposite direction thereby to enable to move said movable means with a small current supplied to said electromagnet.

* * * * *